United States Patent
Khayat et al.

(10) Patent No.: US 6,327,571 B1
(45) Date of Patent: Dec. 4, 2001

(54) METHOD AND APPARATUS FOR HARDWARE REALIZATION PROCESS ASSESSMENT

(75) Inventors: Zakwan Khayat, Wheaton, IL (US); Kathryn Mary McDonough, Marlboro, NJ (US); Seema Nikoonezhad, Freehold, NJ (US); Stephen F. Nygren, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/292,424

(22) Filed: Apr. 15, 1999

(51) Int. Cl.[7] .................................................. G06F 17/60
(52) U.S. Cl. .................................................. 705/10; 705/7
(58) Field of Search ...................................... 705/10, 7, 11

(56) References Cited

U.S. PATENT DOCUMENTS

| | | | |
|---|---|---|---|
| 5,557,547 | * 9/1996 | Phaal | 364/551.01 |
| 5,724,262 | * 3/1998 | Ghahramani | 364/551.01 |
| 5,731,998 | * 3/1998 | Lotiti et al. | 364/570 |
| 5,986,673 | * 11/1999 | Martz | 345/437 |
| 5,999,908 | * 12/1999 | Abelow | 705/1 |

FOREIGN PATENT DOCUMENTS

WO-9959096-A1 * 11/1999 (WO) ............ G06F/17/60

OTHER PUBLICATIONS

Ransley, Derek L., "Do's and don'ts of R&D benchmarking," Sep./Oct. 1994, v37, n5, 10 pages.*

Rangaswamy et al., "Software tools for new product development," Feb. 1997, v34, n1, 8 pages.*

S.E. Miller et al., "Software Development Process Benchmarking," IEEE Globecom, Jan. 1991, pp. 0153–0157.

S.E. Miller et al., "Quality Standards: The Role of Software Process Assessments," IEEE Computer Society, Aug. 1993, pp. 289–296.

* cited by examiner

Primary Examiner—Tariq R. Hafiz
Assistant Examiner—Marc Norman
(74) Attorney, Agent, or Firm—Ryan, Mason & Lewis, LLP

(57) ABSTRACT

The invention provides techniques for performing hardware realization process assessment (HRPA). In an illustrative embodiment, a processing system receives response data, in response to a request for HRPA information, from users associated with a company, organization or other entity to be evaluated. The system transforms the response data in accordance with a predefined transformation including, e.g., a transformation of particular consensus responses to corresponding numerical values, and an averaging of the numerical values across a given analysis category. The system retrieves stored calibration data representative of responses of one or more related entities, and then generates a graphical display including a plot indicative of the transformed response data for the users associated with the entity and including at least a subset of the retrieved stored calibration data. For example, the graphical display may plot the response data in a format which provides simultaneous display of multiple HRPA categories, and which is indicative of upper, lower and middle quartiles of transformed response data from the other related entities.

20 Claims, 3 Drawing Sheets

METHOD AND APPARATUS FOR HARDWARE REALIZATION PROCESS ASSESSMENT

FIELD OF THE INVENTION

The present invention relates generally to techniques for generating, transforming and displaying information characterizing hardware realization processes in a company, organization, project or other entity.

BACKGROUND OF THE INVENTION

Process assessment techniques are often used to characterize the performance of, e.g., a company, organization or project, with respect to their development practices in a particular type of technology. For example, software process assessment techniques are known in the art and utilized to characterize performance of various software development projects. Such techniques may make use of, e.g., a capability maturity model and a database of performance data on related projects in order to provide a basis for performance comparison. In a typical arrangement, a questionnaire may be administered to a designated number of participants associated with a given software development project. The responses of the participants are processed to determine an average score for the project, and scores determined for other related projects, e.g., by other companies, may be made available as part of a summary report.

A drawback of existing process assessment techniques is that such techniques are unable to provide adequate display of process assessment information. For example, existing process assessment techniques fail to incorporate question-by-question and category-by-category comparison with the performance of other companies, organizations or projects. Another disadvantage of existing process assessment techniques is that they are not readily applicable to other types of technologies. For example, existing software process assessment techniques generally cannot be applied to hardware-related process assessment.

A need therefore exists for improved techniques for generating, transforming and displaying information characterizing process assessment, including hardware-related process assessment, such that the information can be more easily understood and more effectively utilized than has heretofore been possible.

SUMMARY OF THE INVENTION

The present invention is directed to a computer-implemented method and apparatus for generating, processing and transforming data relating to process assessment for a company, organization, project or other entity. In an illustrative embodiment, a processing system including a computer or a set of computers processes user responses to a questionnaire or other request for hardware realization process assessment (HRPA) information, i.e., information relating to hardware development processes. The system transforms the received data into a graphical format suitable for display to a user via a terminal, a printout or in another user-perceptible medium. The graphical format is configured such that multiple categories of information are simultaneously displayed along with calibration information indicative of the performance of other related companies, organizations, projects, etc. A given user may therefore be provided with an indication regarding their HRPA-related performance levels relative to those achieved by a number of other similar users.

The HRPA techniques of the present invention may be implemented in one or more software programs running on a personal computer, workstation, microcomputer, mainframe computer or any other type of programmable digital processor. The invention substantially improves the generation, processing and presentation of information relating to HRPA. These and other features and advantages of the present invention will become more apparent from the accompanying drawings and the following detailed description.

DETAILED DESCRIPTION OF THE INVENTION

The present invention will be illustrated below in conjunction with exemplary hardware realization process assessment (HRPA) techniques implemented in computer-based processing systems. It should be understood, however, that the invention is not limited to use with any particular type of information processing system. The disclosed techniques are suitable for use with a wide variety of other systems and in numerous alternative applications.

The present invention is directed to a computer-implemented method and apparatus for generating, processing and transforming data relating to process assessment for a company, organization, project or other entity. In an illustrative embodiment, a processing system including a computer or a set of computers processes user responses to a questionnaire or other request for HRPA-related information, i.e., information relating to hardware development processes. The system transforms the received data into a graphical format suitable for display to a user via a terminal, a printout or another user-perceptible medium. The graphical format is configured such that multiple categories of information are simultaneously displayed along with calibration information indicative of the performance of other related companies, organizations, projects, etc. A given user may therefore be provided with an indication regarding their HRPA-related performance levels relative to those achieved by a number of other similar users.

Figure 1:
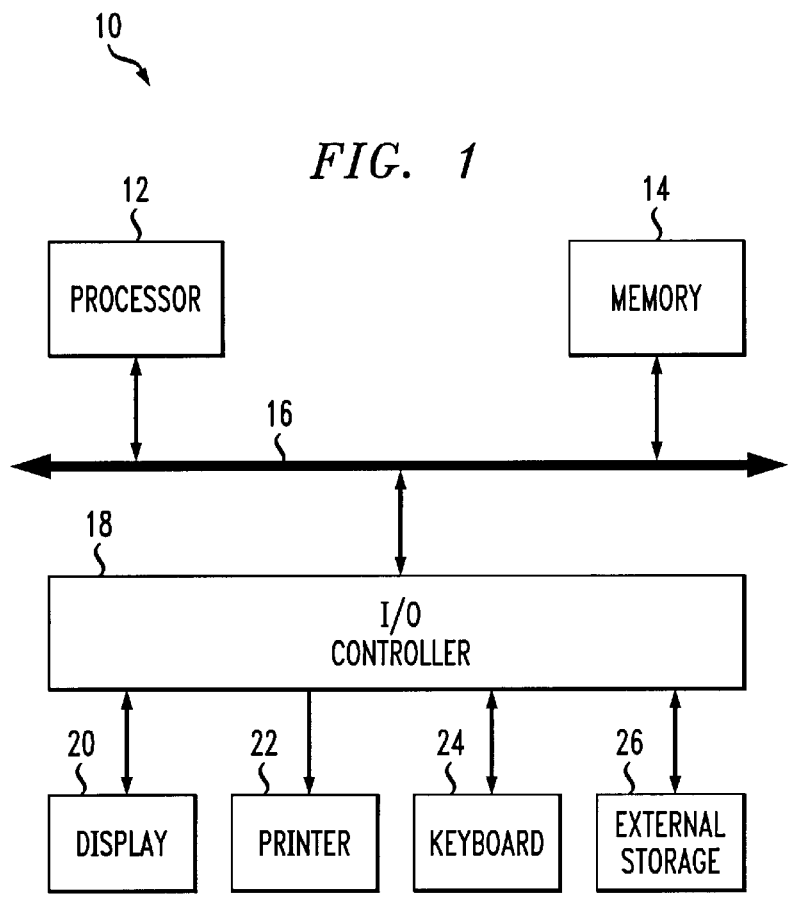
FIG. 1 is a block diagram of a processing system in which hardware realization process assessment (HRPA) techniques may be implemented in accordance with the invention.

FIG. 1 shows an exemplary processing system 10 in which HRPA techniques in accordance with the present invention may be implemented. The processing system 10 includes a processor 12 and a memory 14 which are connected to communicate via a bus 16. The system 10 further includes an input/output (I/O) controller 18 which is connected to the bus 16 in order to communicate with the processor 12 and memory 14. The I/O controller 18 in conjunction with the processor 12 directs the operation of a number of peripheral components including a display 20, a printer 22, a keyboard 24 and an external storage device 26.

One or more of the elements of system 10 may represent portions of a desktop or portable personal computer, a workstation, a microcomputer, a mainframe computer, or other type of digital processor. The memory 14 and external storage device 26 may be electronic, magnetic or optical storage devices. The external storage device 26 may include a database of calibration information, e.g., a database of information on related companies, organizations, projects, etc. that is utilized to generate graphical displays that will be described below in conjunction with FIGS. 3 and 4. The external storage device 26 may be a single device, or may be distributed, e.g., distributed across multiple computers or similar devices. The term "database" as used herein is intended to include any arrangement of stored data.

The present invention may be implemented in the form of a computer software program stored in memory 14. The program is executed by processor 12 in accordance with user-supplied input data to produce a desired output in a predetermined format, e.g., on display 20 or on a print-out generated by printer 22. The user-supplied input data may be entered at the keyboard 24, read from one or more files of external storage device 26, or obtained over a network connection as will be described in conjunction with FIG. 2 below.

Figure 2:
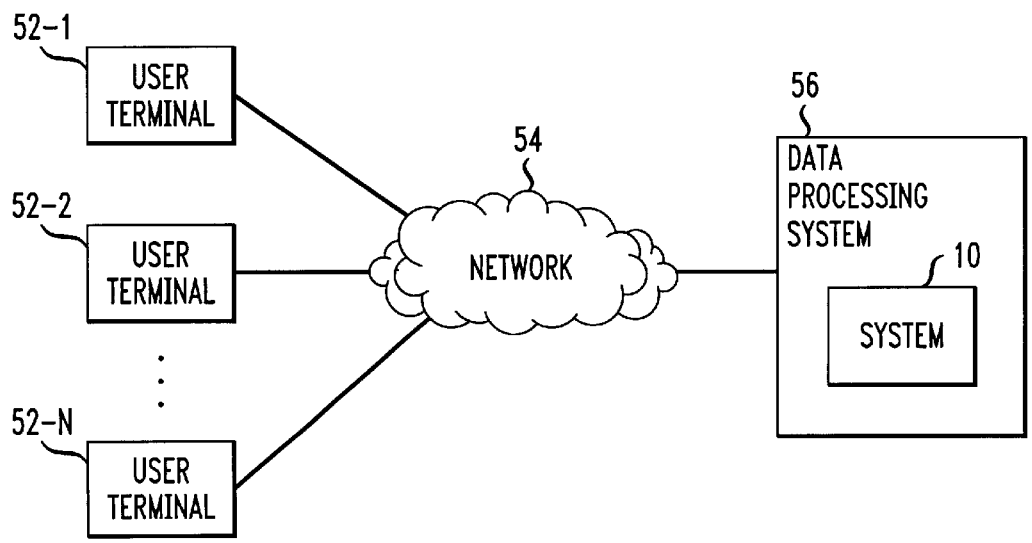
FIG. 2 shows a network-based implementation of the invention which incorporates the processing system of FIG. 1.

FIG. 2 illustrates an exemplary network-based system 50 in which the invention may be implemented. The system 50 includes a set of user terminals 52-i, i=1, 2, . . . N coupled to a network 54. A centralized data processing system 56 is also coupled to the network 54, and includes the system 10 of FIG. 1 as well as additional supporting processing hardware and software. One or more of the user terminals 52-i may be, e.g., desktop or portable personal computers, workstations, personal digital assistants, or other types of digital data processors. For example, one or more of the user terminals 52-i may be a processing system configured as shown in FIG. 1. The network 54 may be, e.g., the Internet, a local area network, a wide area network, an intranet, a telephone, cable or satellite network, as well as combinations or portions of these and other networks.

In operation, one or more of the user terminals 52-i access the centralized data processing system 56 via the network 54 to obtain HRPA-related information. For example, the centralized data processing system 56 may include a server which communicates with the user terminals 52-i via conventional Transmission Control Protocol (TCP)/Internet Protocol (IP) connections. As part of this communication, the system 56 may deliver a user questionnaire or other similar information request to one or more of the user terminals 52-i, e.g., as part of a web page configured in Hypertext Mark-Up Language (HTML) or other suitable file format and delivered over network 54 in accordance with, e.g., the Hypertext Transport Protocol (HTTP). A particular user at one of the user terminals may initiate the communication process by, e.g., entering a Uniform Resource Locator (URL) or similar information identifying a web page associated with the system 56, in a web browser or other application program running on that user terminal. The user can then interact with the system 56 to supply HRPA-related information which is processed in a manner to be described below. A report including one or more graphical displays of processed user information may then be delivered to back to the user terminal over the network 54.

Figure 3:
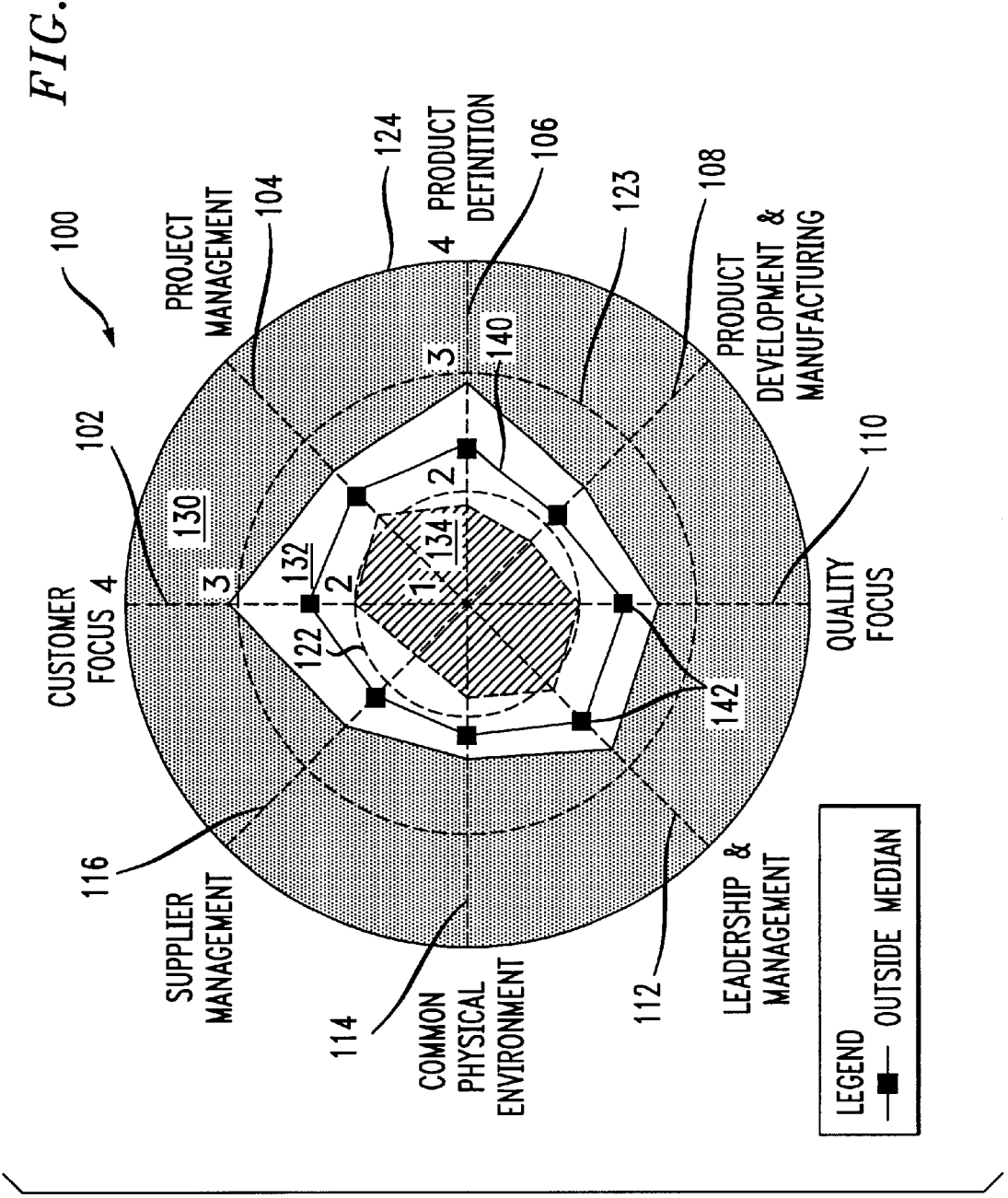
FIG. 3 shows an illustrative graphical display which may be generated by the systems of FIG. 1 or 2 and provides simultaneous display of user results in multiple HRPA analysis categories.

FIG. 3 shows an exemplary graphical display 100 which may be generated by the system 10 of FIG. 1 or the centralized data processing system 56 of FIG. 2 in accordance with the invention. The graphical display in this example is in the form of a so-called Kiviat chart, also referred to as a spider plot. The graphical display 100 includes eight spokes, 102, 104, 106, 108, 110, 112, 114 and 116, corresponding to exemplary HRPA-related information categories of Customer Focus, Project Management, Product Definition, Product Development & Manufacturing, Quality Focus, Leadership & Management, Common Physical Environment, and Supplier Management, respectively. Associated with each of these categories is a number of different questions or other information requests that are responded to, by a given set of users associated with a company or other entity to be evaluated, in the manner previously described.

An example of a questionnaire including questions or other information requests for each of the eight categories identified above is included in the attached Appendix. It should be noted that the questionnaire in the Appendix uses a scale of 1 to 5, with the lower scores indicative of superior performance. The graphical display 100 of FIG. 3 eliminates the portion of the scale between 4 and 5, so as to provide improved clarity for the portion of the scale between 1 and 4. The center of the graphical display 100 corresponds to a response level 1, and the display includes concentric circles 122, 123 and 124 corresponding to response levels 2, 3, and 4, respectively. The graphical display 100 simultaneously displays for each category the consensus results of a set of users associated with the entity being evaluated.

The graphical display 100 includes a number of areas representative of the responses of other related entities. These responses are indicative of the process maturity of a number of other companies, organizations, projects or other entities for which response information has been obtained, and provide a "calibration" against which other users can compare their HRPA-related performance. It is assumed for purposes of this example that these entities are other companies, i.e., "outside" companies other than that of a particular company for which information is plotted in display 100. It should be understood, however, that the described techniques are applicable to other entities, e.g., organizations, projects, etc. The plotted calibration data in this example represent the median results in each category for the outside companies, and each data point may correspond to a different company. The areas 130, 132 and 134 show the scores attained by the worst 25% (lower quartile), middle 50% (middle quartiles) and best 25% (upper quartile), respectively, of the other companies. For example, in the Product Definition category, 25% of the companies scored between about 1.0 and 1.8, while in the Project Management category, 25% of the companies (not necessarily the same companies as in the Product Development category) scored between about 1.0 and 2.1. The areas 130, 132 and 134 of graphical display 100 are referred to as "High Risk," "Leading Company Norm," and "Leading Edge," respectively.

The following is a more detailed explanation of each of the eight categories listed in the exemplary graphical display of FIG. 3.

1. Customer Focus: Examines the level of customer involvement and the level of responding to customer needs in the various stages of product development, such as requirements, customer documentation, testing, and product quality.

2. Project Management: Reviews project management factors such as the level of team communication, the experience and training of project managers, project leadership and authority, risk management, the effectiveness of estimation and scheduling, and the ability to resolve other project management issues.

3. Product Definition: Examines the level of communication and competencies for defining and developing the product among different functional areas, such as system engineering, product development and manufacturing. Also, looks at change management, the emphasis on market analysis, developing and communicating the product strategy, and the usage of target costing.

4. Product Development & Manufacturing: Determines the training and experience of the design team, the level of team communication, and the methodologies for staffing the design team, designing the product, and performing testing to insure the reliability and quality of the product.

5. Quality Focus: Assesses the activities performed to insure the quality of the product, and looks at the processes used in the project and the efforts done for process improvements.

6. Leadership & Management: Looks at the involvement level of upper management throughout the product development, such as performance appraisal, authority for making decisions, sharing common goals, and supporting the project team to resolve technical and resource obstacles.

7. Common Physical Environment: Looks at interruptions, team support issues, office space and environment, and hardware realization infrastructure.

8. Supplier Management: Examines the interfaces and relationships of component strategists and suppliers with product designers, and the methodology of selecting components/parts and their suppliers.

For each analysis category, the graphical display 100 of FIG. 3 compares the responses of a given company to those of the outside companies. The display 100 includes a plot 140 comprising eight data points 142, one for each of the analysis categories. These data points are determined, e.g., by scaling the responses of the set of users for the given company to a questionnaire or other set of information requests, determining a consensus response for each question in each of the categories, and averaging the consensus responses for each of the categories. The consensus response for a particular question is determined by having the set of users across which the company is being evaluated, or a significant subset thereof, reach consensus or agreement as to the correctness of a particular response. A given data point 142 for one of the analysis categories represents an average of consensus responses across all of the questions in that category.

It can be seen from the plot 140 that the scaled responses of the given company for each of the analysis categories fall within the middle 50%, i.e., the area 132 corresponding to "Leading Company Norm." For other companies being evaluated, data points falling within the area 134 indicate analysis categories with above-average performance, while data points falling within the area 130 indicate analysis categories in which there may be a need for improvement. Advantageously, a graphical display such as display 100 provides a company with a clear indication of performance in multiple HRPA-related categories relative to other similar companies.

Figure 4:
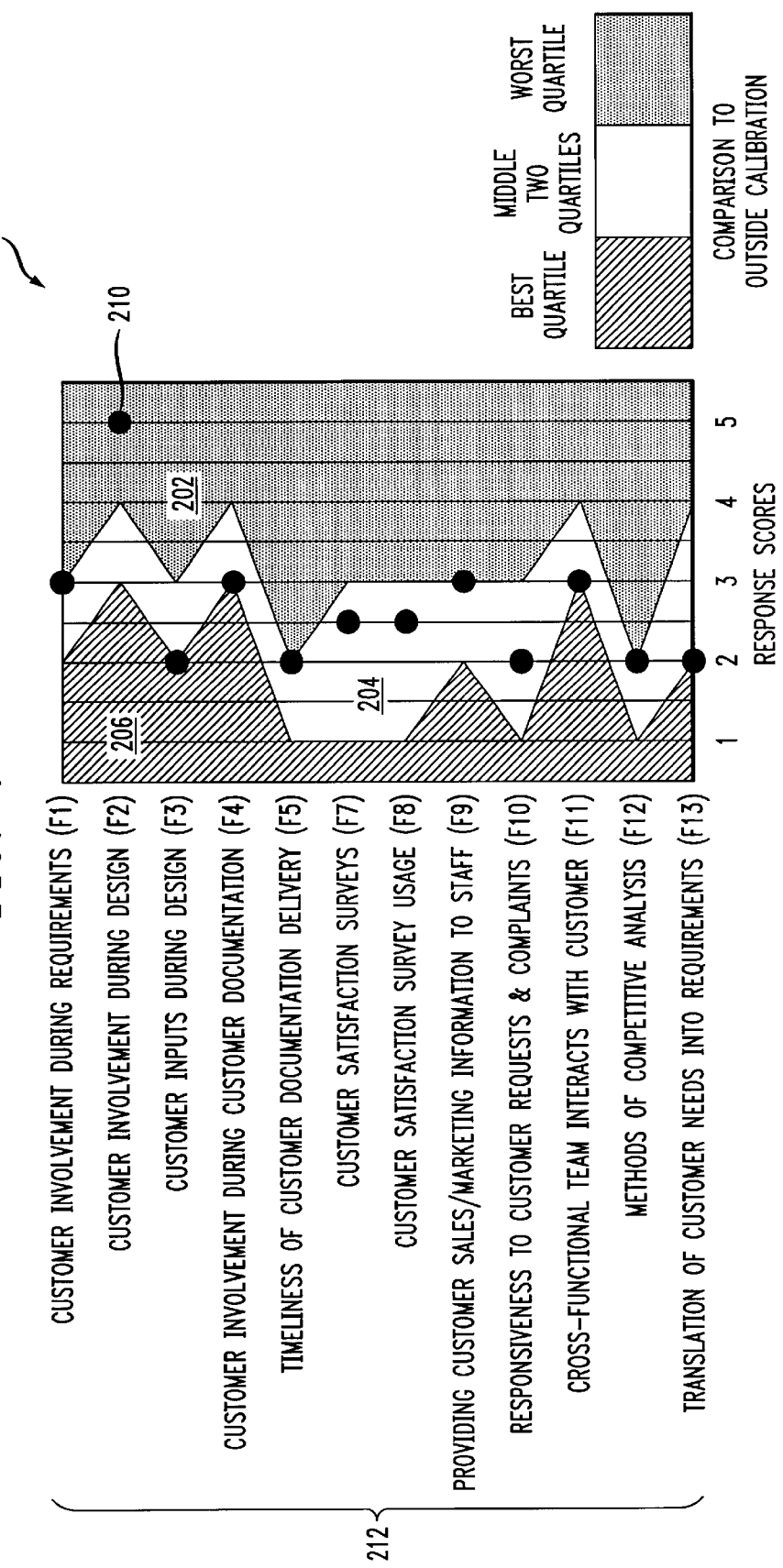
FIG. 4 shows an illustrative graphical display which may be generated by the systems of FIG. 1 or 2 and provides display of user results in a particular HRPA analysis category.

FIG. 4 shows another exemplary graphical display 200 which may be generated by the system 10 of FIG. 1 or the centralized data processing system 56 of FIG. 2 in accordance with the invention. It is again assumed that the calibration data are for other companies, i.e., "outside" companies other than that of the particular company for which information is plotted in display 100. Like the graphical display 100 of FIG. 3, the graphical display 200 includes areas 202, 204 and 206 showing the scores attained by the worst 25% (lower quartile), middle 50% (middle quartiles) and best 25% (upper quartile), respectively, of the other companies. However, in this example display, the response scores are presented on the full scale of 1 to 5. The plotted calibration data again represent the median results in each category for the outside companies, and each data point may correspond to a different company. For example, on the first question (F1) in the category, 25% of the companies gave an answer of 2.0 or less, while on the second question (F2), 25% of the companies (not necessarily the same companies as for F1) gave answers of 3.0 or less. As in the FIG. 3 example, the areas 202, 204 and 206 of graphical display 200 are referred to as "High Risk," "Leading Company Norm," and "Leading Edge," respectively.

A consensus response data point 210 is plotted in the display 200 for each of a series of questions 212 in a given one of the analysis categories, e.g., an analysis category "F" including questions F1 through F13 as shown. Each data point 210 in the display 200 represents a particular consensus response to a corresponding one of the questions F1 through F13. As previously noted, the consensus response is determined by having the set of users across which the company is being evaluated, or a significant subset thereof, reach consensus or agreement as to the correctness of a particular response. A different version of graphical display 200 may be generated for each of the eight analysis categories shown in the display 100 of FIG. 3. Possible answers for questions F1 through F13, as well as questions and possible answers for other HRPA analysis categories, are given in the attached Appendix.

The display 200 may be used to generate a company-specific report analyzing each of the eight analysis categories of hardware realization processes. For each category, a list of strengths and opportunities for improvement may be identified by determining which responses fall within the upper and lower quartiles, respectively, of the outside companies, while responses falling in the middle two quartiles of the outside companies are not specifically identified in the list. For example, from the exemplary display 200 of FIG. 4 and the set of possible responses shown for analysis category "F" in the attached Appendix, the following list of strengths and opportunities for improvement may be identified. The particular responses shown below are from the attached Appendix, and the corresponding question or request for information is indicated in parentheses after the response.

Strengths (Responses Within the Best Quartile of Outside Company Responses)

Most customer inputs are evaluated, and some are incorporated into the design. The changes are within design limits and interval. (F3)

Customers are somewhat involved during documentation. (F4)

Cross-functional team interacts with customer: When needed. (F11)

A process is used to translate customer needs into product requirements. (F13)

Opportunities for Improvement (Responses Within the Worst Quartile of Outside Company Responses)

Customers are not involved during design. (F2)

The graphical displays 100 and 200 of FIGS. 3 and 4, respectively, may be generated in accordance with software program instructions executed by processor 12 of system 10. An appropriately-configured software program in accordance with the invention may, for example, obtain response data from one or more system users, transform the response data into a scaled and averaged numerical format, and generate a display which plots the transformed response data in conjunction with calibration data for other users in the manner previously described.

The above-described embodiments of the invention are intended to be illustrative only. Numerous alternative embodiments may be devised by those skilled in the art without departing from the scope of the following claims.

Khayat 1-1-1-2

Appendix

Hardware Realization Process Assessment Questionnaire: Instructions for Participants Thank you for participating in this Hardware Realization Process Assessment. This assessment will characterize your development practices in the following eight areas:

- customer focus
- product definition
- quality focus
- common physical environment
- project management
- product development and manufacturing
- leadership and management
- supplier management The goal is to examine your project* team's processes and organizational capabilities, allowing you to identify strengths and areas for improvement. As a follow-up to this assessment, your team can develop an action plan to drive improvements to your hardware realization process with the objective of achieving competitive advantage through process excellence.

ORGANIZATION OF THE QUESTIONNAIRE:

The attached questionnaire consists of three modules:
- Project and Business Unit Profile: project and business description plus Questions 1, 2, 3, and 4.
- General Module. This module begins with Project Background Information, Question A1. It includes Sections A, B, C, D, E, F, G, H, I, J, K, and O.
- Management of Portfolio, Product, and Technology. This module begins with Project Leadership and Management, Question G27. It includes Questions G27, I6, and Sections L, M, and N.

WHAT YOU NEED TO DO:

*Site Coordinator*: Fill out the Project and Business Unit Profile and questions A6, A8, A9, A10, A12 and A13. Then fill out the remainder of the General Module and Management of Portfolio, Product, and Technology.

*Managers and project leaders*: fill out the General Module and Management of Portfolio, Product, and Technology.

*Project Team members (non-managers)*: fill out the General Module. Don't worry if you don't know the answers to all the questions in Section A, but be sure to answer all the other questions.

---

* See definition at the end of this Appendix.

Khayat 1-1-1-2

GENERAL GUIDELINES:

- If a question or section that does not apply to your area of expertise, please skip it. All questions and sections will be addressed during a facilitated review meeting.

- For some questions, the terms used might have several meanings based on project area. If the intended meaning is not clear, please write your own definition of the term on which you based your answer.

- For each question, choose the answer that most closely describes your project.

Hardware Realization Process Assessment Questionnaire: Instructions for Site Coordinator For best results, you need to do several things:
- In collaboration with the Assessment Team, select a date for the facilitated review.
- Select the people who will participate in the facilitated review (see below).
- Hold a brief meeting with the people who will participate in the facilitated review.
  - Explain the purpose of the assessment.
  - Clearly explain which project is being assessed, and explain that the questions should be answered with that project in mind (where possible).
  - Outline the agenda for the facilitated meeting (see below).
  - Insure that they will fill out their portions of the questionnaire before the facilitated meeting.
- Fill out the questionnaire yourself. Pay special attention to the Project and Business Unit Profile and questions A6, A8, A9, A10, and A12.

GUIDELINES FOR SELECTING A SUITABLE PROJECT

By the time you receive this, the project to be assessed has already been identified. It should be a recently completed or nearly completed project which is considered to be a major engineering effort and is representative of your business. It is acceptable if it is a project which is substantially underway, but not completed. Breakthrough or incremental projects should be excluded. Both the process use and engineering content for the project should be representative of a typical effort for your business unit. In addition, the project should be:
- a hardware development (as opposed to software); and
- an effort which reflects greater than 20 technical staff years.

GUIDELINES FOR SELECTING PEOPLE TO PARTICIPATE IN THE FACILITATED REVIEW

Representatives from the project team will be asked to participate in a facilitated review of the questionnaire. The best results are obtained when the representatives are carefully chosen so that among them they can answer all questions. The group should be no larger than 15 people.

Khayat 1-1-1-2

One-third to two-thirds of the group should be managers or project leaders. Typical functions of people who will be asked to participate include:

- Circuit design
- Chip design
- System Test
- Sales
- Product management
- Project management
- Physical (mechanical) design
- System engineering
- Marketing
- Quality assurance / metrics
- Product engineering (manufacturing engineering)
- Product documentation

AGENDA FOR A TYPICAL FACILITATED REVIEW (TIMES MAY VARY):

| Time | Activity |
|---|---|
| 8:30 – 8:50 | Introductions, Overview of what to expect |
| 8:50 – 12:00 | Managers and Non-managers reach consensus on Sections A, D, E, F, G, H, I, J, K, and O. Note that Sections B & C will be answered later. |
| 12:00 – 12:30 | Lunch |
| 12:30 – 2:30 | Continue with Sections A, D, E, F, G, H, I, J, K, and O. |
| 2:30 – 3:30 | Managers leave the room. Non-managers reach consensus on Sections B & C. After this, the non-managers have completed their task. |
| 3:30 – 5:00 | Non-managers leave the room and managers return. Managers reach consensus on Sections B & C. Then managers reach consensus on Management of Portfolio, Product, and Technology (Questions G27, I6, and Sections L, M, and N). |

Project and Business Unit Profile Module

Project Title _____

Business Unit or Division _____

Location _____

Review Date: _____

Review Team Members:

Khayat 1-1-1-2

High Level Product Description:

_____

_____

_____

_____

_____

[1] Please check the category you are most familiar with and/or knowledgeable about. All your responses should be made in reference to this category.

Corporation/Company (1)    Division/Group (2)
    Business Unit (3)    Site/Plant (4)

[2] Which category best describes your organization's revenue performance over the past year?

Revenue increased 50% or more (1)    Revenue increased 20% - 50% (2)
    Revenue increased less than 20% (3)    Revenue decreased (4)
    Don't know (5)

[3] Which category best describes your organization's schedule performance over the past year? (Time to Market is defined as Concept to GA.)

Time to Market decreased 50% or more (1)
    Time to Market decreased 20% to 50% (2)
    Time to Market decreased less than 20% (3)
    Time to market increased (4)    Don't know (5)

[4] Which category best describes your organization's profit performance over the past year Profit increased 50% or more (1)    Profit increased 20% to 50% (2)
    Profit increased less than 20% (3)    Profit decreased (4)
    Don't know (5)

Khayat 1-1-1-2

General Module

*For each, select the number that corresponds to the item that is most representative of your organization and mark it on the space to the right of the question heading.*

A. Project Background Information

Project's current stage: ___ [A1]

1. Initial Design
2. Design completed
3. Models built
4. Models evaluated
5. System Integration & Verification
6. Manufacturing Ramp-Up
7. Others:_____

Project nature: ___ [A2]

1. New product. >90% new design
2. New design (requires new architecture) of an existing product. 50% to 90% new design
3. New feature(s) to an existing product. 10% to 50% new design
4. Redesign with no new features added (e.g. to improve quality, manufacturability, cost, reliability, etc.).
5. Others: _____

The design content of the project is: ___ [A3]

1. Only hardware (firmware estimates are to be included in hardware)
2. Mostly hardware and some software
3. Roughly equal amounts of hardware and software.
4. Mostly software and some hardware

[A4] What design tools are used in this project? (e.g. circuit design tools, mechanical tools, manufacturing tools, purchasing tools, component tools, etc.)

Khayat 1-1-1-2

[A5] How many locations are involved in this project, and what are they?

[A6] What is the average total scheduled staff hours per individual per week?
That is, how many non – overtime hours per day do you put on your time sheet? Alternatively, when you determine project schedules, how many hours per day are the schedules based on? (If these are different, give both.)

_____ hours

[A7] For your technical staff, what is the average percent of technical hours spent per week? Technical hours include development, design, project meetings, etc. as opposed to non technical which include administrative, department meetings, time cards, training, etc. (hours working on technical functions divided by total actual work hours)

_____ %

[A8] What was your project start date? (the date at which the feasibility was established and the project was approved and funded)

_____

[A9] What was your project completion date? (For projects not yet completed, please provide the target end date.) Project completion is defined as the date at which there is a first revenue ship to a customer, or there is general availability* so that customer orders can be accepted.

_____

[A10] Over the life of the project, how many individuals were dedicated to this project, and how many worked on multiple projects?

Number full time: _____    Number working on multiple projects: _____

[A11] What was average staff overtime per week? (Count both paid and unpaid overtime.)

_____ hours/week

---

* See definition at the end of this Appendix.

15

Khayat 1-1-1-2

[A12] What was the rate of staff turnover for the life of the project? This question asks about unintended staff turnover. Don't count planned ramp up and ramp down over the project life.

_____ % joined the team          _____ % left the team

[A13] In support of re-use, this design is:
(Re-use = to recycle some of the actual previous designs, e.g. ASIC device, FPGA, section of a design, etc.)

1. 0 - 25% re-used
2. 25 - 50% re-used
3. 50 - 75% re-used
4. 75 - 100% re-used
5. Don't know _____ % reused

B. Project Goals:

|   | | Primary Goal | | | | Not a Goal | |
|---|---|---|---|---|---|---|---|
| 1. | Introduce new capabilities | 1 | 2 | 3 | 4 | 5 | __[B1] |
| 2. | Reduce time to market | 1 | 2 | 3 | 4 | 5 | __[B2] |
| 3. | Meet specific customer need/requirements | 1 | 2 | 3 | 4 | 5 | __[B3] |
| 4. | Reduce development cost | 1 | 2 | 3 | 4 | 5 | __[B4] |
| 5. | Reduce product cost | 1 | 2 | 3 | 4 | 5 | __[B5] |
| 6. | Reduce order realization cost | 1 | 2 | 3 | 4 | 5 | __[B6] |
| 7. | Reduce field returns | 1 | 2 | 3 | 4 | 5 | __[B7] |
| 8. | Improve components selection | 1 | 2 | 3 | 4 | 5 | __[B8] |
| 9. | Reduce complexity | 1 | 2 | 3 | 4 | 5 | __[B9] |
| 10. | Design for multiple applications | 1 | 2 | 3 | 4 | 5 | __[B10] |
| 11. | Increase existing platform* reuse | 1 | 2 | 3 | 4 | 5 | __[B11] |
| 12. | Increase use of small/ multifunctional teams | 1 | 2 | 3 | 4 | 5 | __[B12] |
| 13. | Other:_____ | 1 | 2 | 3 | 4 | 5 | __[B13] |
| 14. | Other:_____ | 1 | 2 | 3 | 4 | 5 | __[B14] |
| 15. | Other:_____ | 1 | 2 | 3 | 4 | 5 | __[B15] |
| 16. | Other:_____ | 1 | 2 | 3 | 4 | 5 | __[B16] |

Rank your goals by priority (select numbers from above):

$1^{st}$: ___[B17]
$2^{nd}$: ___[B18]
$3^{rd}$: ___[B19]

_____
* See definition at the end of this Appendix.

Khayat 1-1-1-2

What actions are you currently taking or planning to take to meet these 3 goals?
1st: _____[B20]

2nd: _____[B21]

3rd: _____[B22]

C. Project Constraints/Risks:

- Project Constraints:
  (Constraints represent existing difficulties or limitations that the project may be facing. They represent items that must be managed very carefully by the project. A major constraint (5) is something that must be dealt with throughout the project. A medium constraint is something that is an occasional roadblock. Not a constraint (1) means that it causes no difficulty.)

|    |                                          | Not a Constraint |   |   |   | Major Constraint |        |
|----|------------------------------------------|---|---|---|---|---|--------|
| 1. | Schedules (intermediate project milestones) | 1 | 2 | 3 | 4 | 5 | ___[C1]  |
| 2. | Customer commitment date                 | 1 | 2 | 3 | 4 | 5 | ___[C2]  |
| 3. | Staff size                               | 1 | 2 | 3 | 4 | 5 | ___[C3]  |
| 4. | Staff experience                         | 1 | 2 | 3 | 4 | 5 | ___[C4]  |
| 5. | SW & HW schedule conflicts               | 1 | 2 | 3 | 4 | 5 | ___[C5]  |
| 6. | Technical difficulty                     | 1 | 2 | 3 | 4 | 5 | ___[C6]  |
| 7. | Development & test tools                 | 1 | 2 | 3 | 4 | 5 | ___[C7]  |
| 8. | Component design & availability          | 1 | 2 | 3 | 4 | 5 | ___[C8]  |
| 9. | Material procurement for models          | 1 | 2 | 3 | 4 | 5 | ___[C9]  |
| 10.| Manufacturing capabilities               | 1 | 2 | 3 | 4 | 5 | ___[C10] |
| 11.| Thermal constraint                       | 1 | 2 | 3 | 4 | 5 | ___[C11] |
| 12.| Interoperability with other products     | 1 | 2 | 3 | 4 | 5 | ___[C12] |
| 13.| Development cost                         | 1 | 2 | 3 | 4 | 5 | ___[C13] |
| 14.| Expense budget (incl. travel & living)   | 1 | 2 | 3 | 4 | 5 | ___[C14] |
| 15.| Other:_____                          | 1 | 2 | 3 | 4 | 5 | ___[C15] |
| 16.| Other:_____                          | 1 | 2 | 3 | 4 | 5 | ___[C16] |
| 17.| Other:_____                          | 1 | 2 | 3 | 4 | 5 | ___[C17] |
| 18.| Other:_____                          | 1 | 2 | 3 | 4 | 5 | ___[C18] |
| 19.| Other:_____                          | 1 | 2 | 3 | 4 | 5 | ___[C19] |

Rank, by priority, the top 3 project constraints

1st: ____[C20]
2nd: ____[C21]
3rd: ____[C22]

- Project Risk:
  (Project risk: The things that are foreseen that could effect the success of the project. Answers this from the point of view that you had at the beginning of the project.)

|     | Not a Risk |   |   |   | Major Risk |        |
|---|---|---|---|---|---|---|
| 23. Market stability | 1 | 2 | 3 | 4 | 5 | __[C23] |
| 24. Technology stability/maturity | 1 | 2 | 3 | 4 | 5 | __[C24] |
| 25. Project management* (lack of coordination) | 1 | 2 | 3 | 4 | 5 | __[C25] |
| 26. Staff turnover | 1 | 2 | 3 | 4 | 5 | __[C26] |
| 27. Requirements stability | 1 | 2 | 3 | 4 | 5 | __[C27] |
| 28. Hardware* stability | 1 | 2 | 3 | 4 | 5 | __[C28] |
| 29. Tools stability | 1 | 2 | 3 | 4 | 5 | __[C29] |
| 30. Component technology | 1 | 2 | 3 | 4 | 5 | __[C30] |
| 31. Suppliers involvement | 1 | 2 | 3 | 4 | 5 | __[C31] |
| 32. Manufacturing participation | 1 | 2 | 3 | 4 | 5 | __[C32] |
| 33. Incomplete testing | 1 | 2 | 3 | 4 | 5 | __[C33] |
| 34. Yield targets | 1 | 2 | 3 | 4 | 5 | __[C34] |
| 35. Failing to achieve product cost target | 1 | 2 | 3 | 4 | 5 | __[C35] |
| 36. Failing to achieve development cost target | 1 | 2 | 3 | 4 | 5 | __[C36] |
| 37. Other:_____ | 1 | 2 | 3 | 4 | 5 | __[C37] |
| 38. Other:_____ | 1 | 2 | 3 | 4 | 5 | __[C38] |
| 39. Other:_____ | 1 | 2 | 3 | 4 | 5 | __[C39] |
| 40. Other:_____ | 1 | 2 | 3 | 4 | 5 | __[C40] |

Rank the 3 major risks for this project

$1^{st}$: ___[C41]
$2^{nd}$: ___[C42]
$3^{rd}$: ___[C43]

---

* See definition at the end of this Appendix.

Khayat 1-1-1-2

D. Formality of Activities

Describe the following project activities as formal or informal or indicate that the activity is/was not performed for your project. For this section, "formal" is defined as documented, repeatable, and effective. If the activity does not apply, please enter N/A.

*1 = Formal    2 = Informal    3 = Not done*

| Activity | | Activity | |
|---|---|---|---|
| Project management | [D1] | Hardware/software co-verification[1] | [D21] |
| Project planning | [D2] | Hardware / software co-design | [D22] |
| Project gate review | [D3] | Models building and support | [D23] |
| Schedule estimation | [D4] | Compliance testing | [D24] |
| Schedule tracking | [D5] | Software development/lab support[2] | [D25] |
| Customer requirements review | [D6] | System testing | [D26] |
| System engineering & architecture | [D7] | Field testing | [D27] |
| DFX reviews[3] | [D8] | Current engineering/maintenance | [D28] |
| Human factors (man machine interface) | [D9] | Supplier quality control | [D29] |
| Hardware architecture review | [D10] | Education & training | [D30] |
| Firmware development | [D11] | Product documentation planning | [D31] |
| Functional (high-level) HW design review | [D12] | Product cost tracking | [D32] |
| Component qualifications | [D13] | RTM reviews[4] | [D33] |
| Make vs. buy review | [D14] | Development cost tracking | [D34] |
| Hardware design | [D15] | Reviews to authorize CI/FOA[5] | [D35] |
| Detailed (low-level) HW design review | [D16] | Factory test & repair[6] | [D36] |
| Unit testing | [D17] | Manufacturing & test process reviews | [D37] |
| Function/feature testing | [D18] | Product management | [D38] |
| Hardware/software integration testing | [D19] | Others: _____ | [D39] |
| Hardware simulation | [D20] | | |

---

[1] Coverification means simultaneous verification of hardware and software by developers prior to system test.
[2] Software that is developed to support hardware testing in the lab. Include both software that is part of the product and software that is specifically needed for testing.
[3] DFX: Design for X, where X might be manufacturability, reliability, testability, etc.
[4] RTM: Ready to Manufacture - not DFX. This is "Am I able to manufacture? That is, do I have components, software to operate the manufacturing equipment, test SW, etc."
[5] CI/FOA: Controlled Introduction/First Office Application
[6] Repair as associated with test failures and not field failures Khayat 1-1-1-2

E. Communication Infrastructure:

*The following questions address the degree to which there is sufficient infrastructure in place to support dispersed functional organizations. Please mark, to the right of the question heading, the number which best represents your organization.*

In support of re-use, design data are ___ [E1]

1. Documented, kept in company-wide controlled system, and are easy to access for evaluation and re-use.
2. Documented in local databases, but can be accessed company-wide.
3. Documented in local databases with no broadcast information, and are not easy to access company-wide.
4. Documented & archived on paper.
5. Not formally kept after the end of the project.

**Customer change management\* during the course of design** (changes requested by customer) ___ [E2]

1. Formal, responsive, efficient and documented change control process managed by a cross-functional\* team.
2. Formal, responsive, efficient and documented change control process managed well within the customer interface team. Changes are then communicated to the project team on a regular basis.
3. Formal, responsive documented process exists; changes are taken by individual customer representatives, and then communicated to others within the customer interface team. Changes are communicated to the project staff in a timely and effective way.
4. Informal change control procedures, and changes are not well documented.
5. Changes are uncoordinated and managed independently by the customer representatives.

Design change management ___ [E3]
Is there a process in place during the design cycle and is it used properly for managing updates and changes (e.g., requirements, designs, resources, etc.) in the various phases of the project?

1. Formal, responsive, efficient and documented change control process managed by a cross-functional team.
2. Formal, responsive, efficient and documented change control process managed within the design community.
3. Formal, responsive, and documented process. Changes are made by designers and then are communicated to others within design community. Efficiency of the process could be improved.
4. Informal change control procedures, and changes are not well documented.

---

\* See definition at the end of this Appendix.

Khayat 1-1-1-2

5. Changes are uncoordinated and managed independently by the designers.

Manufacturing change management ___ [E4]
(Changes driven by manufacturing issues or improvements)

1. Formal, responsive, efficient and documented change control process managed by a cross-functional team with a strong focus on business trade-off decisions.
2. Formal, responsive, efficient and documented change control process managed well within factory personnel who take business considerations into account. Changes are communicated to project team on a regular basis.
3. Formal, responsive and documented process, changes are made by individual manufacturing members, then communicated to others within the factory. Changes are communicated to the project staff at project status meetings.
4. Informal change control procedures, and changes are not well documented.
5. Changes are uncoordinated and managed independently by the manufacturing members.

Project goals ___ [E5]
Is or was there a clear objective that defined the goals and bounded the project?
Were these objectives communicated and clearly understood by team members?

1. The project goals are stable, clearly understood by everyone, and are the basis of all project decisions.
2. The project goals are stable and understood by the majority of team members, and are the basis of most project decisions.
3. The project goal is clear and understood by many people on the project. While the primary goal is clear (at least to management*), some intermediate goals change over time.
4. The project had an objective to start with, but is not adopted by everyone and has undergone some changes. Project goals are not clear.
5. The goals are not clear, and priorities change frequently.

Project information sharing ___ [E6]

1. Project information (e.g. project status and jeopardy, project design information, etc.) is shared regularly, openly and informally. Nothing is a surprise.
2. Most project information is shared regularly, but some surprises occur.
3. Some project information is shared informally, but formal project meetings are the primary source of information.
4. Most project information is shared during formal project meetings, but there are some signs that open communication occurs in isolated areas.
5. Project information sharing is limited to formal project meetings and memoranda. Open communication does not generally occur.

---

* See definition at the end of this Appendix.

Khayat 1-1-1-2

Communication accuracy and timeliness ___ [E7]

1. Accurate, up to date and well-integrated information is readily available (within one day) to all project staff members, and all members have the tools & skills to access the information.
2. Accurate and recent information is available to all project staff members, with a day or more turnaround.
3. Information is moderately accurate and recent, with a week or more turnaround on obtaining the information.
4. Information that is available is somewhat accurate, but it is a month or more out of date.
5. Information that is available is often out of date, its accuracy is questionable, and it is not available to all project personnel.

Conducting project status reviews ___ [E8]

1. Regular project status review meetings are held and documented. Documented agenda & minutes are distributed to all project staff members.
2. Regular project status review meetings are held and documented and communicated to most project staff members.
3. Project status review meetings are held but not well documented.
4. Project status review meetings are conducted on an ad-hoc basis and/or only in a crisis mode.
5. Project status review meetings are not conducted.

Understanding risks ___ [E9]

1. Quantitative methods are employed to understand both marketplace and internal capability risks.
2. Marketplace and internal capability risks are evaluated for each project or program.
3. Marketplace or internal capability risks are examined for most projects.
4. Risks are evaluated by personal experience or through ad-hoc sources for some projects.
5. Risks are rarely or never evaluated.

Managing risks ___ [E10]

1. Both risk elimination strategies and risk management processes work together, are used consistently and results are incorporated into the program or project plan.
2. Risk elimination and management are used but outputs are dealt with separately from the program or project plan.
3. An effective risk management process is used consistently.
4. Risk management is done ad hoc.
5. Risk management is done rarely or never.

Khayat 1-1-1-2

F. Customer/End Users Activities

*When and to what degree are customers and/or end users involved in the project processes? Customers include people purchasing the product and/or using the product.*

Customer involvement during requirements ___ [F1]

1. Customers are active members of the cross-functional team responsible for developing requirements.
2. Customers are frequently involved during requirements.
3. Customers are somewhat involved during requirements.
4. Customers are seldom involved during requirements.
5. Customers are not involved during requirements.

Customer involvement during design ___ [F2]

1. Customers are active members of the team responsible for the design.
2. Customers are frequently involved during design.
3. Customers are somewhat involved during design.
4. Customers are seldom involved during design.
5. Customers are not involved during design.

Customer inputs during design ___ [F3]

1. All customer inputs are evaluated. Those compatible with the design limits and interval are incorporated into the design in a manner that is acceptable to the customer.
2. Most customer inputs are evaluated, and some are incorporated into the design. The changes are within design limits and interval.
3. Most of customer inputs are evaluated, but changes to the design are made only if it is within the design limits.
4. Customer inputs are evaluated after the design is stabilized, but just the critical changes are incorporated, provided they are within the design limits.
5. Customer inputs are not considered during design.

Customer involvement during customer documentation ___ [F4]

1. Customers are active members of the cross-functional team responsible for developing customer documentation.
2. Customers are frequently involved during documentation.
3. Customers are somewhat involved during documentation.
4. Customers are seldom involved during documentation.
5. Customers are not involved during documentation.

Khayat 1-1-1-2

Customer documentation delivery ___ [F5]

1. Customer documentation is always delivered to customers on or before the scheduled due date.
2. Most customer documentation is delivered to the customer on time. Any delays are approved by the customer.
3. Some customer documentation is delivered on time, and some is late (after the product is shipped and installed).
4. Most customer documentation is delivered late and without prior notification and proper explanation to customer on the reason for the delays.
5. Customer documentation is always delivered late.

Customer satisfaction with documentation ___ [F6]

1. Customers quantitatively rate documentation as excellent.
2. Customers quantitatively rate documentation as above average.
3. Customers quantitatively rate documentation as average.
4. Customers quantitatively rate documentation as below average.
5. Customers quantitatively rate documentation as poor, or quantitative rating is unknown.

Customer satisfaction surveys ___ [F7]

1. Customer satisfaction surveys are carried out on a regular basis and results are provided to all staff members.
2. Customer satisfaction surveys are conducted on a regular basis.
3. Customer satisfaction surveys are conducted when needed.
4. Customer satisfaction surveys are rarely carried out.
5. Customer satisfaction surveys are never carried out.

Customer satisfaction survey data usage ___ [F8]

1. Customer satisfaction data are thoroughly analyzed and used to drive improvements.
2. Customer satisfaction data are usually analyzed and used to drive improvements.
3. Customer satisfaction data are somewhat analyzed.
4. Customer satisfaction data are rarely analyzed.
5. Nothing done with customer satisfaction data.

Customer sales/marketing information and/or material are: ___ [F9]

1. Provided to all project staff members regularly.
2. Provided to project staff members at project meetings.
3. Sometimes provided to project staff members.
4. Provided to project staff members if they ask for it.
5. Not provided to project staff members.

Khayat 1-1-1-2

Responsiveness to customers ___ [F10]

1. Formal, documented process with ongoing review and improvement (using specific metrics) for responding to customer needs/requests.
2. Formal process used to measure responsiveness to the customer.
3. Formal process to respond to all customer complaints.
4. Informal and irregular response to customer complaints.
5. There is little or no response to customer complaints.

Cross-functional team interaction with customer ___ [F11]

1. Frequently and at all stages of product realization.
2. At most stages of product realization.
3. When needed.
4. Sometimes.
5. Never.

Competitive analysis ___ [F12]

1. Cross-functional team plans and carries out competitive analysis through benchmarking, product evaluations, etc. Results are systematically incorporated into new product specifications.
2. Some competitive analysis is conducted and results are incorporated into new product designs.
3. Competitive analysis is conducted, but no direct tie is made to new product development.
4. Competitive analysis is often conducted.
5. Competitive analysis is impromptu or non-existent.

Translation of requirements ___ [F13]

1. A validated process is used consistently to translate customer needs into product requirements.
2. A process is used to translate customer needs into product requirements.
3. A process is sometimes used to reflect customer needs in product requirements.
4. Translation of requirements is done by a cross-functional team without a set process.
5. Translation of requirements is impromptu.

Khayat 1-1-1-2

G. Project Leadership & Management

Project management process ___ [G1]

1. Decision making and accountability is well defined and clear; project management is recognized as a competency (process is documented, used, effective, and repeatable)
2. Project management process is defined end to end from concept to GA (General Availability) by phase (gate) and is integrated across all relevant functional areas.
3. Project management process is defined from concept to GA (General Availability) and is integrated across most functional areas.
4. Project management process is defined within one or more functional areas but it is not well integrated across all of them.
5. Project management process is informal, not well defined, or based mainly on individual experience.

Management's project phase (gate) reviews ___ [G2]

1. There are well-structured phase (gate) reviews at key decision points involving a unified decision by a cross-functional management group.
2. There are phase (gate) reviews at key decision points involving sequential sign-off from all of the functions.
3. Phase (gate) reviews are held at regular calendar-based intervals either within or across functions.
4. Phase (gate) reviews are held mostly within functional areas.
5. Phase (gate) reviews are ad-hoc and/or rarely held unless there is a crisis.

Khayat 1-1-1-2

How many of the following activities are conducted?

| Project structure methodology | • Conduct face-to-face meetings with all organizations involved.<br>• Clarify differences in organizations' goals, processes, and styles.<br>• Ensure there is/are upper management champion(s).<br>• Use a gate process* concept.<br>• Identify & get buy-in on roles & responsibilities.<br>• Develop a mechanism to transfer and replace staff. | _____ [G3]<br>1 = *All of the items*<br>2 = *5 of the items*<br>3 = *4 of the items*<br>4 = *3 of the items*<br>5 = *2 or less* |
|---|---|---|
| Project implementation methodology | • Establish clear issue escalation, resolution, decision-making mechanisms.<br>• Joint regular tracking of well defined and agreed upon hand-offs and milestones.<br>• Identify an overall project manager and a dedicated coordinator at each location.<br>• Conduct regular status meetings.<br>• Encourage and foster good team relationships between organizations. | _____ [G4]<br>1 = *All of the items*<br>2 = *4 of the items*<br>3 = *3 of the items*<br>4 = *2 of the items*<br>5 = *1 or 0* |

(Question G5 deleted) _____ [G5]

Project leadership _____ [G6]

1. Project leadership roles and responsibilities are clearly defined and consistent for the duration of the project. One leader is assigned for the duration of the project (from beginning of development through general availability).
2. Project leadership roles and responsibilities are clearly defined for the project and a leader is assigned for the duration of the project. Some variance in roles and responsibilities occurs over time.
3. A project leader is assigned for the duration of the project.
4. Project leadership is often unclear or varies by phase.
5. Ad hoc groups or individuals lead the project.

---

* See definition at the end of this Appendix.

Khayat 1-1-1-2

Project accountability and authority ___ [G7]

1. A cross-functional project team has accountability for project success, with clear authority to make decisions on its behalf and to execute the project.
2. A cross-functional project team has accountability for the project success, with some authority to execute the project.
3. Project accountability resides with the technical managers; project team members have some authority but may be overruled by technical managers.
4. Project accountability resides with technical manager, but the technical manager has no authority to make any major decisions.
5. No one has clear authority or accountability for the success of the project.

Project staffing ___ [G8]

1. Project staffing is assigned by technical and project managers jointly; staffing changes are rare and continuity is the norm.
2. Project staffing is assigned by technical and project managers jointly; staffing may change over time but continuity is the shared goal.
3. Project staffing is assigned by technical managers with input from project manager; the technical managers may change staffing as their priorities change.
4. Project staffing is assigned by technical managers, and changes to staff sometimes occur without advance notice.
5. Project staffing is done informally and changes can be frequent and unpredictable.

Project participant performance appraisal ___ [G9]

1. Technical manager and team leader perform appraisal jointly; team performance is heavily weighted as a basis for evaluation and reward.
2. Technical manager does appraisal using team leader inputs and participant's contribution to the team.
3. Technical manager does appraisal with input from team or team leader; team performance and individual contribution are equally weighted.
4. Technical manager does appraisal with input from team or team leader; team performance is considered but functional or individual contribution predominates as basis for evaluation and reward.
5. Technical manager does appraisal, based largely on individual contribution, not team performance.

Project team morale ___ [G10]

1. Entire team is highly enthusiastic about the project.
2. Most team members are enthusiastic about the project.
3. Normal project morale and enthusiasm.
4. Visible morale problems.
5. Very low morale.

Khayat 1-1-1-2

Agreement on project goals ___ [G11]

1. Full team cross-functional agreement on project goals.
2. Majority cross-functional agreement on project goals.
3. Some cross-functional agreement on project goals.
4. Majority cross-functional disagreement on project goals.
5. Sharp cross-functional disagreement on project goals.

Agreement on project schedules ___ [G12]

1. Full team cross-functional agreement on project schedules.
2. Majority cross-functional agreement on project schedules.
3. Some cross-functional agreement on project schedules.
4. Majority cross-functional disagreement on project schedules.
5. Sharp cross-functional disagreement on project schedules.

Project manager experience ___ [G13]

1. > 5 years average management experience on hardware projects of similar scope.
2. 3-5 years average management experience on hardware projects of similar scope.
3. 1-2 years average management experience on hardware projects of similar scope.
4. < 1 year average management experience on hardware projects of similar scope.
5. No previous management experience on hardware projects of similar scope.

Project manager training ___ [G14]
Have the skills required for the success of the project been inventoried? Is there a structured training process in place for acquiring the skills needed to execute the project successfully?

1. Training required for all project managers as specified in the organization's core curriculum and other relevant courses in the areas of hardware project management.
2. Training required for new project managers as specified in the organization's core curriculum.
3. Training recommended, but not required for new project managers.
4. Training available at the discretion of new project managers.
5. Training available, but not supported by upper management.

Project scheduling and resource planning ___ [G15]

1. Project interval and resource guidelines reflecting internal experience and external benchmarks are used.
2. Project interval and resource guidelines reflecting internal experience and external benchmarks when available are used.
3. Project interval and resource guidelines reflecting internal experience are used.
4. Estimates are based on comparison to past projects.
5. There are no effective means to estimate project schedules and resource requirements.

29

Khayat 1-1-1-2

Hardware staff effort estimates are typically: ___ [G16]
(For hardware staffing during development phase)

1. Within 10% of actual effort.
2. Within 25% of actual effort.
3. Within 50% of actual effort.
4. Within 100% of actual effort.
5. Staff estimates are not done or compared.

Hardware schedule estimates are typically: ___ [G17]

1. Within 10% of actual schedules.
2. Within 25% of actual schedules.
3. Within 50% of actual schedules.
4. Within 100% of actual schedules.
5. HW schedules are not estimated or compared.

Schedule tracking tools ___ [G18]

1. Automated tools to capture progress and compare to scheduled milestones.
2. Partially automated tools to capture progress and compare to scheduled milestones.
3. Manual tools to capture progress and compare to scheduled milestones.
4. Manual tools to capture progress, but progress is not compared to scheduled milestones.
5. No tracking tools used.

Previous project's lessons learned are reviewed: ___ [G19]

1. For all projects.
2. For most of the projects.
3. For some of the projects.
4. When there is a critical need.
5. This is not done.

Previous project's lessons learned are used: ___ [G20]

1. To help drive improvements for each project.
2. To help drive improvements for most projects.
3. To occasionally drive improvements.
4. To rarely drive improvements.
5. Not used at all.

Khayat 1-1-1-2

*Please mark the number which reflects how many bulletized items are representative of your organization's hardware development and process improvement efforts.*

| Hardware development processes are/have: | • Documented<br>• Effective<br>• Used<br>• On-line and staff support | 1 = *All of the items*<br>2 = *3 of the items*<br>3 = *2 of the items*<br>4 = *1 of the items*<br>5 = *None* | [G21] |
|---|---|---|---|
| Continuous process improvement* efforts: | • Take place systematically<br>• Take place frequently<br>• Include retrospectives from all projects<br>• Include benchmarks against the best in class | 1 = *All of the items*<br>2 = *3 of the items*<br>3 = *2 of the items*<br>4 = *1 of the items*<br>5 = *None* | [G22] |
| Characteristics of development tools: | • Effective<br>• Well maintained<br>• Up to date<br>• Stable<br>• Easy to use | 1 = *All of the items*<br>2 = *4 of the items*<br>3 = *3 of the items*<br>4 = *2 of the items*<br>5 = 1 or *none* | [G23] |

**Continuous process improvement* accountability**  ____ [G24]

1. A process owner is accountable for continuous and measurable improvements and for identifying and driving major initiatives required to achieve overall significant improvements.
2. A process owner is accountable for implementing continuous performance improvements; improvements are primarily incremental.
3. A process owner is accountable for maintaining and administering the process in terms of documentation and training but little effort is done to improve the process.
4. Individual functional managers are implicitly accountable for their parts of the development process; there is no one accountable for overall process performance or continuous process improvement.
5. No process to track continuous process improvement efforts.

---

* See definition at the end of this Appendix.

31

Khayat 1-1-1-2

Project and process metrics: ___ [G25]

1. Process improvement targets are set based on comparisons to world class external targets; project and process metrics are tracked and reported relative to targets.
2. Project and process metrics are defined, tracked internally, and used to set targets for process improvement.
3. Project and process metrics are maintained but are not used to set overall process improvement targets.
4. Project metrics are maintained, but no process metrics exist.
5. No metrics are in place for the product development process.

Platform strategy ___ [G26]

1. Platform / derivative / variant products are proactively planned and positioned to maximize customer need fulfillment and minimize development costs.
2. Platform / derivative / variant products are reactively balanced, based on marketplace conditions.
3. Platform / derivative / variant product balance is weighted incorrectly toward too many platform or variant product offerings.
4. Few (<20%) Platform / derivative / variant product families exist.
5. No Platform / derivative / variant products families exist.

H. Development staff experience and methodologies:

Hardware design training for staff ___ [H1]

1. Training required for hardware designers as specified in the organization's core curriculum and other relevant courses in the areas of hardware design.
2. Training required for hardware designers as specified in the organization's core curriculum.
3. Training recommended, but not required, for hardware designers.
4. Training available at the discretion of the hardware designers.
5. Training available, but not supported by management.

Khayat 1-1-1-2

Design technology experience _____ [H2]
For H2, H3 and H4, *experienced* indicates formal or on-the-job training along with sufficient, actual use to be considered proficient.

1. All designers are experienced with the technology being used or developed in this project.
2. Most designers are experienced with the technology being used or developed in this project.
3. Even mixture of experienced and inexperienced designers.
4. Most designers are inexperienced or newly trained in the technology being used or developed in this project.
5. All designers are inexperienced or newly trained in the technology being used or developed in this project.

Methods experience _____ [H3]

1. All designers are experienced with company standard processes, procedures, and tools (design methods).
2. Most designers are experienced with the design methods.
3. Even mixture of experienced and inexperienced designers.
4. Most designers are inexperienced or newly trained in the design methods.
5. All designers are inexperienced or newly trained in the design methods.

Programming language experience (e.g., C, Assembly, etc.) _____ [H4]

1. Proactively identifying programming skills needed for the project and ensure that all designers have the required experience.
2. Most designers have the necessary programming experience.
3. Even mixture of experienced and inexperienced designers.
4. Most designers are inexperienced or newly trained in the necessary programming languages.
5. All designers are inexperienced or newly trained in the necessary programming languages.

Prototyping _____ [H5]

1. Early prototyping is performed with rapid iterations of the entire design.
2. Early prototyping is performed for the entire design.
3. Early prototyping is performed for many portions of the design.
4. Prototyping is performed for few portions of the design.
5. No prototyping is done.

Khayat 1-1-1-2

**Availability of prototypes* for test** ___ [H6]

1. There are always a sufficient number of prototypes available.
2. There are a limited number of prototypes available with a short wait.
3. Critically needed prototypes are available with a short wait, but others must wait considerably longer.
4. There are a limited number of prototypes available with a long wait.
5. There are no prototypes.

Technical review and inspection experience ___ [H7]
*Experienced* indicates formal or on-the-job training along with sufficient, actual use to be considered proficient.

1. All designers are experienced in review and inspection processes (design reviews, code inspections, document reviews, etc.).
2. Most designers are experienced in review and inspection processes.
3. Even mixture of experienced and inexperienced designers.
4. Most designers are inexperienced or newly trained in review and inspection processes.
5. All designers are inexperienced or newly trained in review and inspection processes.

Project team experience ___ [H8]

1. > 5 years average experience with hardware projects.
2. 3-5 years average experience with hardware projects.
3. 1-2 years average experience with hardware projects.
4. < 1 year average experience with hardware projects.
5. No previous experience with hardware projects.

Requirements are reviewed and baselined ___ [H9]

1. Before the start of the design.
2. When the design is less than 10% complete.
3. When the design is less than 50% complete.
4. When the design is more than 50% complete, but before product is shipped to customers.
5. After the product is shipped to customers.

Reliability prediction based on architecture ___ [H10]

1. Reliability prediction tools that are proven accurate are used before development begins.
2. Reliability prediction is done on the selected architecture before development begins.
3. Reliability prediction begins during development.
4. Reliability prediction begins after prototypes are available.
5. No reliability prediction is done.

---

* See definition at the end of this Appendix.

Khayat 1-1-1-2

Manufacturing Yield prediction ___ [H11]

1. Yield prediction tools that are proven accurate are used to evaluate proposed architectures.
2. Yield prediction is done on the selected architecture before development begins.
3. Yield prediction begins during development.
4. Yield prediction begins after prototypes are available.
5. No yield prediction is done.

| Architecture/System partitioning strategy includes: | <ul><li>Cost budget for each partition</li><li>Schedule impact for each partition</li><li>Division among functional areas</li><li>Compatibility with existing or planned products and networks</li><li>Reliability/performance</li><li>Variation (tolerance/margin)</li></ul> | ———<br>1 = *Based on all items.*<br>2 = *Based on five items.*<br>3 = *Based on three or four items.*<br>4 = *Based on one or two items.*<br>5 = *No partitioning strategy exists.* | [H12] |
|---|---|---|---|

Software and hardware product interfaces ___ [H13]

1. All software and hardware product interfaces are identified prior to the start of design and are under change control.
2. All software and hardware product interfaces are identified prior to the start of design, but not under change control.
3. Only high level interfaces are identified prior to the start of design, the rest are identified during development.
4. All software and hardware product interfaces are jointly identified during development.
5. Each software & hardware development identifies its own interfaces independently.

Software and hardware interface verification ___ [H14]

1. Always use the proven, up-to-date and easy to use advanced methods to perform a complete software and hardware interface verification.
2. Use mostly advanced methods to perform the critical software and hardware interface verification.
3. Occasional use of advanced methods to fix a problem with software and hardware interface.
4. Use out-dated methods to perform portions of the software and hardware interface verification.
5. Not much software and hardware interface verification is done.

35

Khayat 1-1-1-2

Design capture methods ___ [H15]

1. Always use of the proven, up-to-date and easy to use tools to capture the complete design.
2. Use mostly proven, up-to-date and easy to use tools to capture most of the design.
3. Some of the design is captured using different design capture tools and some of the tools are out-dated.
4. Part of the design is captured on paper and the rest is captured by CAD* tools, and then submitted to support organization to capture the paper portion with CAD tools.
5. The entire design is captured on paper, and then submitted to a support organization to capture with CAD tools.

I. Environmental Variables

Interruptions (not related to the project) ___ [I1]

1. Interruptions can be eliminated, when necessary
2. A few unwanted interruptions
3. Some interruptions
4. Frequent interruptions
5. Constant interruptions

Clerical support ___ [I2]

1. Clerical support is always available to most project members when needed.
2. Some clerical support available to most project members when needed.
3. Clerical work must be scheduled in advance.
4. Clerical support is available to managers, but not to others.
5. Project members do all their own clerical work.

Hardware realization infrastructure ___ [I3]

1. All proven, up-to-date and easy to use equipment & tools, design environment and lab space, and manufacturing needs are available and easy to access & use.
2. Most of the proven, up-to-date and easy to use equipment & tools, manufacturing needs, and design environment including lab space are available, but prior arrangement is needed.
3. Some of the proven and up-to-date equipment & tools and limited lab space and manufacturing needs are available for hardware realization.
4. There are few equipment and outdated tools available to do basic hardware realization with limited design environment, including lab space.
5. A few equipment and limited lab space and manufacturing needs are available to do basic hardware realization, but no tools.

---

* See acronym list at the end of this Appendix.

Khayat 1-1-1-2

Overall effectiveness of documentation tools ___ [I4]

1. All staff members have common automated documentation tools (text and graphics) to provide easy exchange. (e.g., MS Office)
2. Most staff members have common automated documentation tools (text and graphics) to provide easy exchange.
3. Staff members have automated text and automated graphics, but manual integration is required.
4. Automated text, graphics hand drawn and manually integrated.
5. No automated tools for text or graphics.

System test lab availability and support for testing large and complex systems ___ [I5]

1. System lab is well maintained, up to date with the latest software release, easy to access and well supported by a qualified lab staff.
2. System lab is maintained daily, updated on a weekly basis, relatively easy to access and supported by a lab staff.
3. System lab is maintained daily, updated on a weekly basis but not easy to get lab time and with limited support staff.
4. System lab is maintained and updated weekly but difficult to access and with no lab support staff.
5. System lab is poorly maintained and there is no lab support staff.

J. Component and Suppliers Management

Component strategist (project component manager, PCM) ___ [J1]

1. An experienced project component strategist is assigned to the project.
2. A specific person, not as experienced, is assigned to the project to manage day to day component issues.
3. A project team member, not necessarily a strategist, is designated as the component manager.
4. Team members informally consult with a component strategist from another project.
5. Individual designers manage components in their part of the design.

Khayat 1-1-1-2

Key supplier involvement ___ [J2]

1. All suppliers with major (>5% of total product acquisition cost) product content are active project team members throughout the project from planning to ramp-up and their development methodology is aligned with the project methodology.
2. All suppliers with major product content are intimately involved throughout the project wherever appropriate.
3. *Greater than 50%* of suppliers with major product content are involved during development planning.
4. Suppliers are only involved in the development when there is a crisis.
5. Suppliers are not involved in development.

| | The project uses: | |
|---|---|---|
| Component selection criteria: | <ul><li>Use of qualified components as defined by the component management organization</li><li>Use of preferred components</li><li>Use of preferred suppliers</li><li>Avoid problem technologies</li><li>Avoid components with known problems (problems could be performance, quality, field problems, future availability, etc.)</li><li>Avoid single source components</li></ul> | ___ [J3]<br>*1 = All of the items listed*<br>*2 = 5 of the items listed*<br>*3 = 4 of the items listed*<br>*4 = 2 or 3 of the items listed*<br>*5 = 0 or 1 of the items listed* |

Component selection tools ___ [J4]

1. The project uses a well-defined and user-friendly global tool that provides complete component selection coverage.
2. The project uses multiple on-line tools and catalogs.
3. The project uses a local component strategy group to provide component needs.
4. The project uses a local component database that other engineers update and maintain.
5. The project uses catalogs and interfaces with suppliers individually.

Khayat 1-1-1-2

Supplier selection criteria ____ [J5]

1. A corporate supplier strategy exists and is maintained which contains supplier ratings, supplier development plans and supplier quality reviews which is used by component strategists and designers during component selection.
2. A corporate supplier strategy exists and is maintained which contains supplier ratings and supplier development plans which is used by component strategists and designers during component selection.
3. A project supplier strategy exists and is maintained which contains supplier ratings which is used by component strategists and designers during component selection.
4. A project supplier strategy exists and is maintained and contains supplier ratings, and is sometimes used by designers during component selection.
5. Designers select their own suppliers.

Component availability and lead time ____ [J6]

1. Project team identifies candidate components, during planning, that might not be readily available or have a long lead-time, and eliminates them or completes contingency plan(s) and informs upper management of issues & contingency plan(s).
2. Project team identifies candidate components that might not be readily available and escalates this issue to upper management.
3. Project team identifies candidate components that might not be readily available or has a long lead-time during development.
4. Project team does not find out about component lead-time or availability until that they want to use the part, and then tries to come up with alternatives.
5. Project team does not consider the lead-time or availability of components.

Component management process ____ [J7]
(Includes component lifecycle management and change notification)
1. A formally documented corporate component management process managed by a cross-functional team is strictly adhered to by all projects.
2. A formally documented corporate component management process managed by a cross-functional team is used by all projects to develop their own project component management process.
3. A formally documented corporate component management process managed by a cross-functional team is available for all projects to use.
4. The team uses its own project component management process.
5. No formally documented component management process exists.

Khayat 1-1-1-2

Component selection database ___ [J8]

1. A managed corporate component database exists that is used by all projects for component selection.
2. A managed corporate component database exists that is used by some projects for component selection.
3. Managed project component databases exist that are easily accessible by other projects to use for component selection.
4. A managed project component information database exists for component selection.
5. No project component information database exists for component selection.

Component reliability process ___ [J9]

1. A component reliability process exists that includes Derating Guidelines, FIT* assessment and Component Qualification.
2. A component reliability process exists that includes two of the following: Derating Guidelines, FIT assessment, and Component Qualification.
3. A component reliability process exists that includes Component Qualification.
4. A component reliability process does not exist, but vendor component qualification data is used.
5. No component reliability process exists and vendor data is not used.

Make vs. buy decision process ___ [J10]

1. A well-defined make vs. buy process is used to identify and evaluate all outsourcing candidates.
2. A well-defined make vs. buy process is used to identify and evaluate most outsourcing candidates.
3. A make vs. buy process is used on critical outsourcing candidates defined by management.
4. There is an informal process to evaluate some outsourcing candidates.
5. There is no make vs. buy process.

Supplier development process ___ [J11]

1. A well defined, up-to-date process for supplier development, with on going activities to develop or update a qualified suppliers list using benchmarking data & market analysis.
2. There is a supplier development process, and a set of selected suppliers being developed.
3. There is a set of suppliers being developed in key technologies but no formal process exists.
4. There are isolated cases of suppliers being developed with no links between the work.
5. There are no suppliers being developed.

---

* See acronym list at the end of this Appendix.

Khayat 1-1-1-2

K. Test & Verification

Test strategy ___ [K1]

1. Test strategy developed before and during product development by cross-functional team.
2. Test strategy developed during product development by cross-functional team.
3. Test strategy developed during product development by developers.
4. Ad-hoc test strategy developed during and after development.
5. No test strategy exists.

Test plan is developed: ___ [K2]

1. By the project team, in parallel with test strategy development before and during product development.
2. By the project team during product development.
3. By developers only during product development.
4. Ad-hoc test planning during and after product development.
5. There is no test plan.

| The project uses: | | |
|---|---|---|
| Gate array device verification (includes ASIC*, FPGA*) | • Perform high level functional verification.<br>• Perform gate level functional verification.<br>• Perform timing verification at worst case high and low temperatures.<br>• Perform timing verification.<br>• Perform synchronous design audits.<br>• Perform fault simulation and verification. | ___ [K3]<br>1 = *All of the items listed*<br>2 = *5 of the items listed*<br>3 = *3 to 4 of the items listed*<br>4 = *1 to 2 of the items listed*<br>5 = *None of the items listed* |

Design verification - Full system test strategy ___ [K4]

1. Perform built-in self-test (BIST) testing, functional testing, verification of ASIC types designs, factory system tests, and other needed lower level testing.
2. Perform most of the testing mentioned above.
3. Perform some of the testing mentioned above.
4. Perform the necessary testing if the design or product is not working.
5. No verification testing performed.

---

* See acronym list at the end of this Appendix.

Khayat 1-1-1-2

Building models / prototypes \_\_\_ [K5]

1. All models/prototypes are assembled on the same production line(s) that will be used for high volume manufacturing.
2. Early models/prototypes are assembled by development and later ones on the production lines.
3. All models/prototypes are assembled in a local model shop.
4. All models/prototypes are assembled by developers for testing only.
5. No models or prototypes made.

**Compliance testing (EMC\*, EST\*, thermal, safety and reliability)** \_\_\_ [K6]

1. Perform compliance testing on each design element, (circuit pack, shelf, cabinet) and on the final completed product in its deliverable configuration. Maintain configuration control once the product is tested. Periodically retest to insure the required levels are maintained.
2. Perform compliance testing on the final completed product in its deliverable configuration. Maintain configuration control once the product is tested. Periodically retest to insure the required levels are maintained.
3. Perform compliance testing on the final completed product in its deliverable configuration. Maintain configuration control once the product is tested.
4. Perform compliance testing on the final completed product in its deliverable configuration.
5. Perform compliance testing on a prototype similar to the product in its final configuration.

O. Open-ended Questions:

Over the past year, what unusual events have occurred during the project? (e.g., redirection, high turnover, transfers, significant problems with a functional area?)

_____

_____

_____ [O1]

What are the project's strengths?

_____

_____

_____ [O2]

---

\* See acronym list at the end of this Appendix.

42

Khayat 1-1-1-2

What is most rewarded by management and/or the organization? and how?

_____

_____ [O3]

What are the project's opportunities for improvements?

_____

_____ [O4]

What is most penalized by management and/or organization? and how?

_____

_____ [O5]

What is the principle role of management?

_____

_____ [O6]

What do you view as the major obstacles to achieving high productivity and/or quality in your environment?

_____

_____ [O7]

Khayat 1-1-1-2

Thinking of activities that are already underway, list any significant initiatives to improve productivity and/or quality (e.g., courses, % staff effort, tools).

_____

_____ [O8]

Thinking of activities you would recommend for the future, what recommendations would you make to improve productivity and/or quality?

_____

_____ [O9]

Any other comments you would like to make or other issues you would like to bring up that we did not cover?

_____

_____ [O10]

Khayat 1-1-1-2

Management of Portfolio, Product, and Technology

The following section is to be completed by managers and project leaders.

Managerial

G. Project Leadership and Management

Hardware design training for managers ___ [G27]

1. Training required for hardware design managers as specified in the organization's core curriculum and other relevant courses in the areas of hardware design.
2. Training required for hardware design managers as specified in the organization's core curriculum.
3. Training recommended, but not required, for hardware design managers.
4. Training available at the discretion of the hardware design managers.
5. Training available, but not supported by upper management.

I. Environmental Variables

Information technology (IT) support of communication ___ [I6]

1. An IT strategy & plan is used to provide appropriate communication technology such as: Email, access to WEB, PC/LAN, etc. These vehicles work well with each other and are well supported by IT personnel.
2. Most electronic communication vehicles are available and IT support is available most of the time.
3. Some electronic communication vehicles are available with some IT support when it is requested.
4. Email is the only electronic communication vehicle available with very limited IT support.
5. Phone & verbal discussions are the only methods of communication. IT support does not exist.

*The questions beyond this point deal with issues at a higher level than the project in terms of portfolios, product management and cost and technology management.*

L. Portfolio Planning & Management*

Customer and business priorities across the portfolio ___ [L1]

1. Priorities are reflected in a portfolio, which is strategically aligned and balanced to include all kinds of projects.
2. Portfolio priorities are considered one project at a time through a structured decision process for projects.
3. Priorities are set annually (or periodically) through budgeting or one-time portfolio analyses.
4. Priorities are set informally within the portfolio.
5. No process for setting priorities.

Resource allocation across the portfolio ___ [L2]

1. Resource allocation plans are developed using automated tools across the company or division for long term needs through forecasting product development requirements based on product strategy and resources needed to meet customer needs.
2. Resources are allocated to projects by a cross-functional management team using aggregate resource management tools, looking across all project forecasts.
3. Resources are allocated to projects by a cross-functional management team, one project at a time using automated project management tools.
4. Technical managers control resources and juggle allocations according to availability.
5. There is no resource allocation process.

Resource availability ___ [L3]

1. Resource availability and long term resource requirements are well managed across all functions.
2. Resource availability is well managed and resources applied to major projects so that over commitment can be avoided.
3. Managers know where their resources are being applied and their availability.
4. There is little reliable information about what projects are underway and how resources are really applied to them.
5. No formal process to determine resources availability and needs.

---

* See definition at the end of this Appendix.

Khayat 1-1-1-2

Skill set planning ___ [L4]

1. Skill set planning is based on long-term forecasts. (> 2 years).
2. Skill set planning is based on short-term forecasts (1-2 years).
3. Skill set planning is based on immediate forecasts (1 year).
4. Skill set plans are based on today's bottlenecks.
5. No skill set plans

Decision making authority ___ [L5]

1. A clearly defined cross-functional management team is responsible for approving, canceling or redirecting projects.
2. A defined cross-functional management team has some responsibility for approving, canceling or redirecting projects.
3. Technical managers are formally assigned to assure that their function's deliverables have been met; sequential decisions often change the direction of projects.
4. Key decisions are made by one or two technical managers operating informally.
5. There is no one clearly responsible for making decisions to start, stop or change the direction of a project.

Basis for decisions ___ [L6]

1. Decisions are immediate and based on accurate information that allows valid comparisons across projects; project recommendations are well structured with clear decision criteria; decisions are fact-based.
2. Decisions are timely and based on accurate information and recommendations are presented and reviewed; decision criteria is defined.
3. Extensive information is required before a decision can be made; teams may be sent back for more information or details; decisions are slow but good; decision criteria is somewhat defined.
4. Incomplete information, no structured method to classify the information, decisions are often very slow and sometimes good; decision criteria takes the form of hurdles.
5. Information on which decisions are based is poor and there are no clear decision criteria.

Khayat 1-1-1-2

M. Product Management & Target Costing*

Product strategy communication      ___ [M1]

Product strategy = a clearly delineated direction for the product and its association to a product line and platforms 1. Product strategy is well defined, communicated and understood by all staff members via a cascading of goals aligned with the strategy.
2. Product strategy is well defined, communicated and understood by most staff members.
3. Product strategy is defined, communicated and understood by some staff members.
4. Product strategy is loosely defined and communicated but not well understood by staff members.
5. Product strategy is undefined and/or unknown across the project.

Marketplace sensing / awareness      ___ [M2]

1. Long-range marketplace sensing using many sources, including competitive analysis, is ongoing and is formally included in the product strategy process.
2. There is formal process to use the market and technology trends information as major inputs to product strategy.
3. Market and technology trends are important inputs to product strategy but assessing and using this information is informal and inconsistent.
4. The business responds reactively to opportunities and threats as they become known; time-to-react is long.
5. No process for marketplace awareness.

Strategic market and product vision      ___ [M3]

1. The strategic vision for products and markets is well defined and includes: relevant target markets, intended future products, how they will be differentiated, and the technologies and capabilities upon which they will be based.
2. The strategic vision for products and markets is well defined, and it does identify the required capabilities to make it happen.
3. The strategic vision for products and markets is defined, and it does identify some of the capabilities required to make it happen.
4. The strategic vision for products and markets is loosely defined by overall business strategy.
5. There is no strategic vision.

---

* See definitions at the end of this Appendix.

Khayat 1-1-1-2

| Data used for product target costing includes: | | | |
|---|---|---|---|
| Product target costing basis | • Market prices and conditions<br>• Internal prices<br>• Benchmarking and competitive costs<br>• Internal historical costs<br>• Commercial Cost Models<br>(eg. COCOMO, "Price Models") | ———<br><br>1 = *All of the items listed*<br>2 = *4 of the items listed*<br>3 = *3 of the items listed*<br>4 = *1 or 2 of the items listed*<br>5 = *There is no product target costing effort* | [M4] |
| Targets established for various types of costs: | • Manufacturing COGS*<br>• Material (BOM: Bill of Material) costs<br>• Manufacturing labor and load<br>• Function-level<br>• Component-level | ———<br><br>1 = *All of the items listed*<br>2 = *4 of the items listed*<br>3 = *3 of the items listed*<br>4 = *1 or 2 of the items listed*<br>5 = *There is no product target costing effort* | [M5] |
| The target costing process involves: | • Marketing and Product Management<br>• Project Management<br>• Hardware Development<br>• Software Development<br>• Purchasing/ Supplier Management<br>• Manufacturing | ———<br><br>1 = *All of the items*<br>2 = *5 of the items*<br>3 = *3 or 4 of the items*<br>4 = *1 or 2 of the items*<br>5 = none | [M6] |

Commercial Cost models (eg. COCOMO)  ___ [M7]
1. Commercial cost models are used from the earliest stages of design as the main cost reporting mechanism to predict target cost attainment
2. Commercial cost models are used by engineers for key reviews or to demonstrate proximity to target costs.
3. Commercial cost modeling is applied as a supplement to other methods
4. Commercial cost models are applied a few times during the development.
5. No commercial cost modeling is used.

---

* See acronym list at the end of this Appendix.

Khayat 1-1-1-2

Target costing is used for: ___ [M8]
(Target costing = setting cost goals that reflect marketplace realities, as real specifications, early in the project.)
1. Over 90% of products under development (project/product count).
2. Only flagship products (ones that produce major revenue).
3. Only products that are expected to become flagship products.
4. Only a few selected products which have major contribution to margin.
5. Target costing is not used.

N. Technology Management

Core technology management ___ [N1]

1. Core technologies to support or enable new and current platforms and products are well defined, tracked and maintained within the business; technology and product line plans are well integrated across the company; aligned technology roadmaps are frequently developed and used.
2. Core technologies to support or enable new and current platforms and products are well defined, tracked and maintained within the business; aligned technology roadmaps are occasionally developed and used.
3. Core technologies to support and enable current platforms and products are defined, tracked and maintained within the technical community.
4. Core technologies to support and enable current platforms and products are tracked, but not maintained.
5. There are no formal approaches for monitoring technology developments and trends.

Opportunity identification/innovation process: ___ [N2]

1. Market-based product and technology strategy guides and focuses the business level process to identify, document, evaluate, and select new product/technology opportunities; innovation is proactive and anticipatory.
2. There is a business level process to identify, document, evaluate, and select new product/technology opportunities; this process can be modulated based on the need and capacity for growth; *innovation* is measured.
3. There is a formal process to identify, document, evaluate, and select new product/technology opportunities in the marketing and or technology functions but they are not well connected; innovation is opportunistic and not measured.
4. There is informal process to identify, document, evaluate and select new product/technology opportunities; innovation is highly reactive and incremental.
5. There is no process to identify opportunities, and no innovation.

Khayat 1-1-1-2

Technology development ___ [N3]

1. The process that distinguishes technology from product development is integrated with the product development process through a well-defined technology transfer approach.
2. There is a process that distinguishes technology from product development; this process provides a framework for project planning and execution and is somewhat linked to the product development process.
3. There is informal process that distinguishes technology from product development, but weak linkage to development projects.
4. There is no process for technology development distinct from product development; each technology development project in effect creates its own approach.
5. Technology development does not take place.

Technology roadmapping methodology ___ [N4]

1. Technology roadmapping is developed using the company and business unit's strategy and plan, which includes identifying critical technology and linking them to business competitive strategies.
2. Technology roadmapping is developed using the business unit's strategy and plan while employing some roadmapping processes.
3. Technology roadmapping is developed based solely on feedback received from the customers.
4. Technology roadmapping is developed based on the organization's experience with previous projects.
5. No technology roadmapping is in place.

| The development of technology roadmapping is based on: | | | |
|---|---|---|---|
| Technology roadmap basis: | <ul><li>Customer drivers</li><li>Offer roadmap</li><li>Business drivers</li><li>Component roadmap</li><li>Manufacturing roadmap</li><li>Software roadmap</li><li>Tools roadmap</li><li>Training roadmap</li></ul> | *1 = All of the items listed*<br>*2 = 6 to 7 of the items listed*<br>*3 = 3 to 5 of the items listed*<br>*4 = 1 to 2 of the items listed*<br>*5 = There is no technology roadmapping in place* | [N5] |

Khayat 1-1-1-2

Core technology leverage ___ [N6]

1. Core technologies are separated from non-core and the company sells divisions that are non-core
2. Core technologies are separated from non-core and supplier / partners are integrated in design through production for most non-core technologies
3. Core technologies are separated from non-core and supplier / partners are integrated in design through production for some non-core technologies
4. Core technologies are separated from non-core and supplier / partners are used for production in most non-core technologies.
5. Core technologies are not segregated from non-core. Supplier arrangements do not map to core vs. non-core technology

Acronyms

ASIC - Application Specific Integrated Circuit

BIST - Built On Self Test

BOM - Bill Of Material

CAD - Computer Aided Design

CI/FOA - Controlled Introduction/First Office Application

COGS - Cost of Goods Sold

DFX - Design For X (X=manufacturability, reliability, testability, etc.)

EMC - Electro -Magnetic Compliance

EST - Environment Stress Testing

FIT - Failures In Time

FPGA - Field Programmable Gate Array

IT - Information Technology

PCM - Project Component Manager

RTM - Ready To Manufacture

Definitions

Change Management: A structured documented process for managing changes in the project or portions of the project.

Continuous Improvement: The process of continually learning from previous experiences and applying these lessons to current and future activities.

What is claimed is:

1. A computer-implemented method for processing data associated with a hardware realization process assessment of an entity, the method comprising the steps of:
   receiving response data, in response to a request for hardware realization process assessment information, from a plurality of users associated with the entity, the response data characterizing hardware development processes of the entity in a plurality of information categories;
   transforming the response data in accordance with a predefined transformation including at least a transformation of particular responses to corresponding numerical values;
   retrieving stored calibration data representative of responses of one or more related entities; and
   generating a graphical display including at least first and second plots indicative of at least a portion of the transformed response data for the users associated with the entity, the first plot being configured so as to provide a comparison of the hardware development processes of the entity to corresponding processes of the one or more related entities, the first plot providing for each of the plurality of information categories an associated performance indication for the entity and a category-based comparison indication for the one or more related entities, the second plot corresponding to particular one of the plurality of information categories and having a set of plotted points with each of the plotted points representative of one or more of the numerical values and an associated question-based comparison indication for the one or more related entities, the category-based and question-based comparison indications being determined based at least in part on the calibration data.

2. The method of claim 1 wherein the entity comprises at least one of a company, an organization and a project.

3. The method of claim 1 wherein the entity is a first company and the one or more related entities include a plurality of other companies operating in a field related to that of the first company.

4. The method of claim 1 wherein the request for hardware realization process assessment information includes a questionnaire including at least one information request in at least a subset of the following categories: Customer Focus, Project Management, Product Definition, Product Development & Manufacturing, Quality Focus, Leadership & Management, Common Physical Environment, and Supplier Management.

5. The method of claim 4 wherein the predefined transformation for a given one of the categories includes a transformation of particular consensus responses to corresponding numerical values, and an averaging of the numerical values across the given one of the categories.

6. The method of claim 1 wherein the graphical display includes a display of the calibration data in a format indicative of at least one of an upper quartile and a lower quartile of response data from the other related entities.

7. The method of claim 1 wherein the graphical display comprises a Kiviat chart having a plurality of spokes, with each of at least a subset of the spokes corresponding to a category of information in the request for hardware realization process assessment information.

8. The method of claim 1 wherein the graphical display includes a set of plotted points corresponding to a particular category of information in the request for hardware realization process assessment information.

9. An apparatus for processing data associated with a hardware realization process assessment of an entity, the apparatus comprising:
   a processor-based system having a processor coupled to a memory and being operative (i) to receive response data, in response to a request for hardware realization process assessment information, from a plurality of users associated with the entity, the response data characterizing hardware development processes of the entity in a plurality of information categories; (ii) to transform the response data in accordance with a predefined transformation including at least a transformation of particular responses to corresponding numerical values; (iii) to retrieve stored calibration data representative of responses of one or more related entities; and (iv) to generate a graphical display including at least first and second plots indicative of at least a portion of the transformed response data for the users associated with the entity, the first plot being configured so as to provide a comparison of the hardware development processes of the entity to corresponding processes of the one or more related entities, the first plot providing for each of the plurality of information categories an associated performance indication for the entity and a category-based comparison indication for the one or more related entities, the second plot corresponding to a particular one of the plurality of information categories and having a set of plotted points, with each of the plotted points representative of one or more of the numerical values, and an associated question-based comparison indication for the one or more related entities, the category-based and question-based comparison indications being determined based at least in part on the calibration data.

10. The apparatus of claim 9 wherein the entity comprises at least one of a company, an organization and a project.

11. The apparatus of claim 9 wherein the entity is a first company and the one or more related entities include a plurality of other companies operating in a field related to that of the first company.

12. The apparatus of claim 9 wherein the request for hardware realization process assessment information includes a questionnaire including at least one information request in at least a subset of the following categories: Customer Focus, Project Management, Product Definition, Product Development & Manufacturing, Quality Focus, Leadership & Management, Common Physical Environment, and Supplier Management.

13. The apparatus of claim 12 wherein the predefined transformation for a given one of the categories includes a transformation of particular consensus responses to corresponding numerical values, and an averaging of the numerical values across the given one of the categories.

14. The apparatus of claim 9 wherein the graphical display includes a display of the calibration data in a format indicative of at least one of an upper quartile and a lower quartile of response data from the other related entities.

15. The apparatus of claim 9 wherein the graphical display comprises a Kiviat chart having a plurality of spokes, with each of at least a subset of the spokes corresponding to a category of information in the request for hardware realization process assessment information.

16. The apparatus of claim 9 wherein the graphical display includes a set of plotted points corresponding to a particular category of information in the request for hardware realization process assessment information.

17. The apparatus of claim 9 wherein the processing system includes a database for storing the calibration data associated with the other related entities.

18. The apparatus of claim 9 wherein the processing system is operative to request the hardware realization process assessment information via a web page associated with the system and accessible to at least a subset of the users via a network connection.

19. The apparatus of claim 9 wherein the processing system is operative to receive at least a portion of the response data over a network connection established between the system and a user terminal associated with one or more of the plurality of users.

20. A computer-readable medium storing one or more software programs for processing data associated with a hardware realization process assessment of an entity, wherein the one or more programs when executed by a processor include:

- a step for receiving response data, in response to a request for hardware realization process assessment information, from a plurality of users associated with the entity, the response data characterizing hardware development processes of the entity in a plurality of information categories;
- a step for transforming the response data in accordance with a predefined transformation including at least a transformation of particular responses to corresponding numerical values;
- a step for retrieving stored calibration data representative of responses of one or more related entities; and
- a step for generating a graphical display including at least first and second plots indicative of at least a portion of the transformed response data for the users associated with the entity, the first plot being configured so as to provide a comparison of the hardware development processes of the entity to corresponding processes of the one or more related entities, the first plot providing for each of the plurality of information categories an associated performance indication for the entity and a category-based comparison indication for the one or more related entities, the second plot corresponding to a particular one of the plurality of information categories and having a set of plotted points with each of the plotted points representative of one or more of the numerical values and an associated question-based comparison indication for the one or more related entities, the category-based and question-based comparison indications being determined based at least in part on the calibration data.

\* \* \* \* \*